(12) United States Patent
Lin

(10) Patent No.: US 10,605,112 B2
(45) Date of Patent: Mar. 31, 2020

(54) FAN DRIVE GEAR SYSTEM SPLINE OIL LUBRICATION SCHEME

(71) Applicant: United Technologies Corporation, Hartford, CT (US)

(72) Inventor: Ning Lin, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 741 days.

(21) Appl. No.: 14/768,822

(22) PCT Filed: Feb. 17, 2014

(86) PCT No.: PCT/US2014/016694
§ 371 (c)(1),
(2) Date: Aug. 19, 2015

(87) PCT Pub. No.: WO2014/137571
PCT Pub. Date: Sep. 12, 2014

(65) Prior Publication Data
US 2016/0003090 A1 Jan. 7, 2016

Related U.S. Application Data

(60) Provisional application No. 61/772,130, filed on Mar. 4, 2013.

(51) Int. Cl.
*F01D 15/12* (2006.01)
*F02C 7/36* (2006.01)
(Continued)

(52) U.S. Cl.
CPC ............ *F01D 15/12* (2013.01); *F01D 5/02* (2013.01); *F01D 25/28* (2013.01); *F02C 3/04* (2013.01);
(Continued)

(58) Field of Classification Search
CPC . F01D 15/12; F01D 5/02; F01D 25/16; F01D 25/18; F01D 25/28; F02C 3/04; F02C 3/107; F02C 7/06; F02C 7/32; F02C 7/36; F16H 1/48; F16H 57/0486; F05D 2220/36; F05D 2230/60; F05D 2230/642;
(Continued)

(56) References Cited

U.S. PATENT DOCUMENTS 5,433,674 A * 7/1995 Sheridan ............... F16H 1/2809
475/346
6,223,616 B1 5/2001 Sheridan
(Continued)

FOREIGN PATENT DOCUMENTS

| EP | 1837542 A2 | 9/2007 |
| EP | 2511500 A2 | 10/2012 |
| WO | 2011/039633 A1 | 4/2011 |

OTHER PUBLICATIONS

International Preliminary Report on Patentability for International Application No. PCT/US2014/016694 dated Sep. 17, 2015.
(Continued)

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

An input coupling for a fan drive gear system includes features for maintaining lubricant within a splined interface. The fan drive gear system includes a gear rotatable about an axis that includes an inner spline. The input coupling includes an outer spline engaged to the inner spline of the gear. The input coupling includes an aft oil dam for maintaining lubricant within an interface between the outer spline and the inner spline.

13 Claims, 3 Drawing Sheets

(51) Int. Cl.
　　　F02C 3/107　　(2006.01)
　　　F01D 5/02　　(2006.01)
　　　F01D 25/28　　(2006.01)
　　　F02C 3/04　　(2006.01)
　　　F02C 7/06　　(2006.01)
　　　F16H 1/48　　(2006.01)
　　　F16H 57/04　　(2010.01)

(52) U.S. Cl.
　　　CPC ............... *F02C 3/107* (2013.01); *F02C 7/06* (2013.01); *F02C 7/36* (2013.01); *F16H 1/48* (2013.01); *F16H 57/0486* (2013.01); *F05D 2220/36* (2013.01); *F05D 2230/60* (2013.01); *F05D 2230/642* (2013.01); *F05D 2240/35* (2013.01); *F05D 2260/40311* (2013.01); *F05D 2260/602* (2013.01); *F05D 2260/98* (2013.01)

(58) Field of Classification Search
　　　CPC ...... F05D 2240/35; F05D 2260/40311; F05D 2260/602; F05D 2260/98; F02K 3/06
　　　USPC ........................................ 60/39.08
　　　See application file for complete search history.

(56) References Cited

U.S. PATENT DOCUMENTS

| | | | |
|---|---|---|---|
| 7,493,754 B2 | 2/2009 | Moniz et al. | |
| 7,849,668 B2 | 12/2010 | Sheridan | |
| 7,926,260 B2 | 4/2011 | Sheridan et al. | |
| 8,167,727 B2 * | 5/2012 | Anema | F16D 3/185 464/156 |
| 8,307,626 B2 | 11/2012 | Sheridan | |
| 2007/0084184 A1 | 4/2007 | Orlando et al. | |
| 2008/0006018 A1 * | 1/2008 | Sheridan | F01D 25/18 60/39.1 |
| 2008/0093174 A1 | 4/2008 | Suciu et al. | |
| 2012/0088624 A1 | 4/2012 | Sheridan | |
| 2012/0275904 A1 | 11/2012 | McCune et al. | |
| 2012/0277055 A1 | 11/2012 | Sheridan | |

OTHER PUBLICATIONS

International Search Report and Written Opinion for International Application No. PCT/US2014/016694 dated May 26, 2014.

* cited by examiner

US 10,605,112 B2

FAN DRIVE GEAR SYSTEM SPLINE OIL LUBRICATION SCHEME

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

A coupling between the gear assembly and shaft transfers loads and also accommodates relative misalignment and movement. The coupling requires lubrication to maintain functionality and to remain within desired temperature limitations.

Although geared architectures have improved propulsive efficiency, turbine engine manufacturers continue to seek further improvements to engine performance including improvements to thermal, transfer and propulsive efficiencies.

SUMMARY

A fan drive gear system according to an exemplary embodiment of this disclosure, among other possible things includes a gear rotatable about an axis. The gear includes an inner spline. An input coupling includes an outer spline engaged to the inner spline of the gear. The input coupling includes an aft oil dam for maintaining lubricant within an interface between the outer spline and the inner spline.

In a further embodiment of the foregoing fan drive gear system, the gear includes a forward tab extending radially inward from an inner surface of the gear forward of the inner spline.

In a further embodiment of any of the foregoing fan drive gear systems, the gear includes an aft tab extending radially inward from an inner surface of the gear aft of the inner spline and forward of the aft oil dam.

In a further embodiment of any of the foregoing fan drive gear systems, the aft oil dam includes a retaining ring supported within an annular channel of the input coupling.

In a further embodiment of any of the foregoing fan drive gear systems, the retaining ring extends radially outward into contact with an inner surface of the gear.

In a further embodiment of any of the foregoing fan drive gear systems, the gear includes a sun gear.

In a further embodiment of any of the foregoing fan drive gear systems, the input coupling includes at least one U-shaped portion for accommodating relative movement and misalignment with the gear.

A geared turbofan engine according to an exemplary embodiment of this disclosure, among other possible things includes a fan rotatable about an engine axis, a core engine including a turbine section driving a turbine shaft, a gearbox including a sun gear driven by the turbine shaft, and an input coupling transferring power between the turbine shaft and the sun gear. A retaining ring is mounted on the input coupling and engages an inner surface of the sun gear to maintain lubricant within an interface between the sun gear and the input coupling.

In a further embodiment of the foregoing geared turbofan engine, the sun gear includes a forward tab disposed forward of the interface and an aft tab disposed aft of the interface.

In a further embodiment of any of the foregoing geared turbofan engines, the interface includes first splines on an inner surface of the sun gear and second splines on an outer surface of the coupling shaft.

In a further embodiment of any of the foregoing geared turbofan engines, includes lubricant feeding nozzle directing lubricant within the interface.

In a further embodiment of any of the foregoing geared turbofan engines, the retaining ring is supported within an annular channel defined on the input coupling aft of the interface.

In a further embodiment of any of the foregoing geared turbofan engines, the input coupling includes at least one flexible portion for accommodating relative movement between the gearbox and the turbine shaft.

A method of assembling a geared turbofan engine according to an exemplary embodiment of this disclosure, among other possible things includes supporting a gearbox about an engine axis, mounting a retaining ring onto a forward end of an input coupling, and inserting the input coupling into a sun gear of the gearbox such that the retaining ring engages an inner surfaces of the sun gear.

In a further embodiment of the foregoing method, includes forming an annular channel on the input coupling for holding the retainer ring on the input coupling.

In a further embodiment of any of the foregoing methods, includes forming an aft tab on the sun gear for limiting an axial distance that the input coupling may extend into the sun gear.

In a further embodiment of any of the foregoing methods, includes mounting an oil jet proximate the inner surface of the sun gear for directing oil into an in interface between the input coupling and the sun gear.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
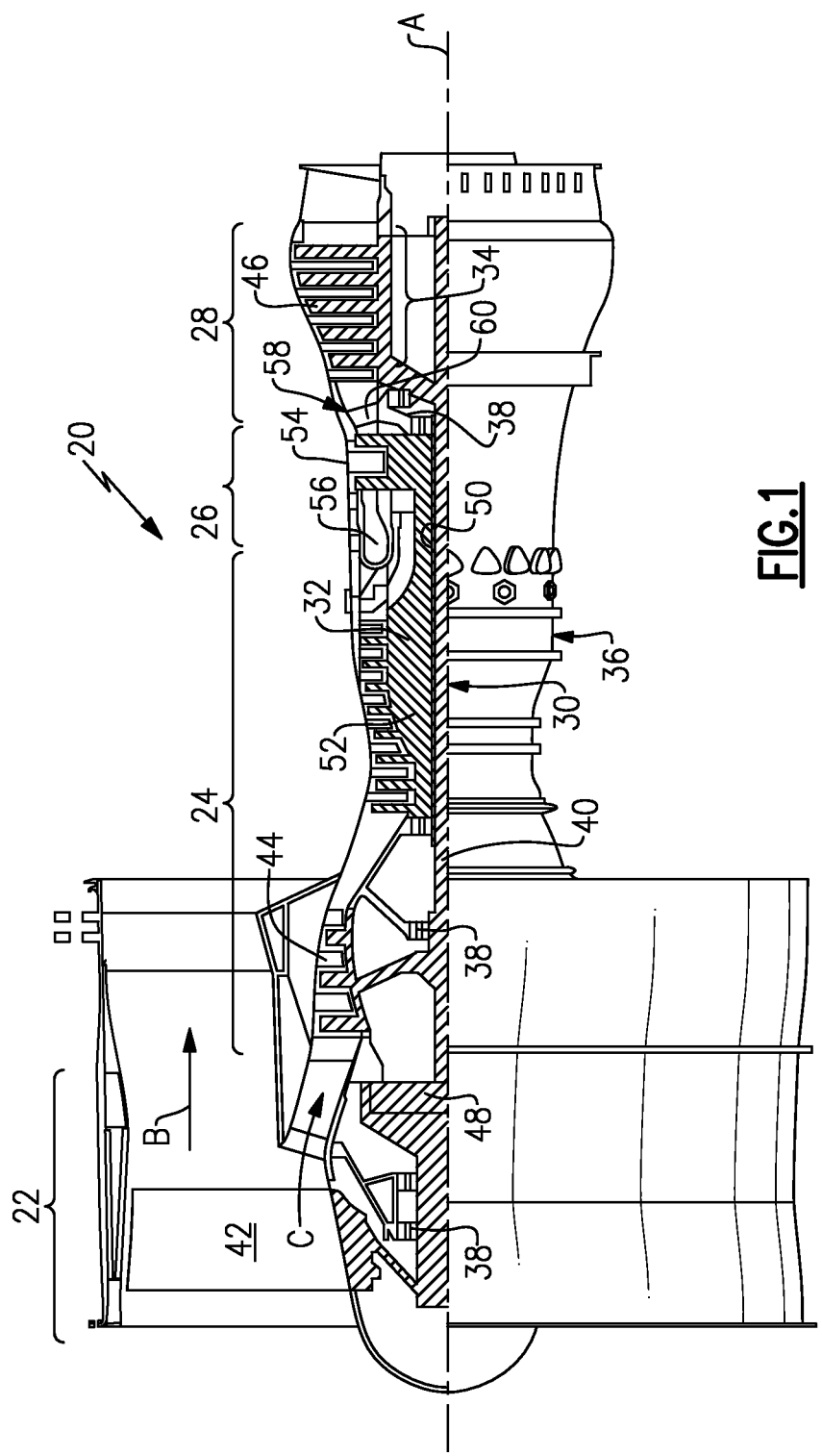
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
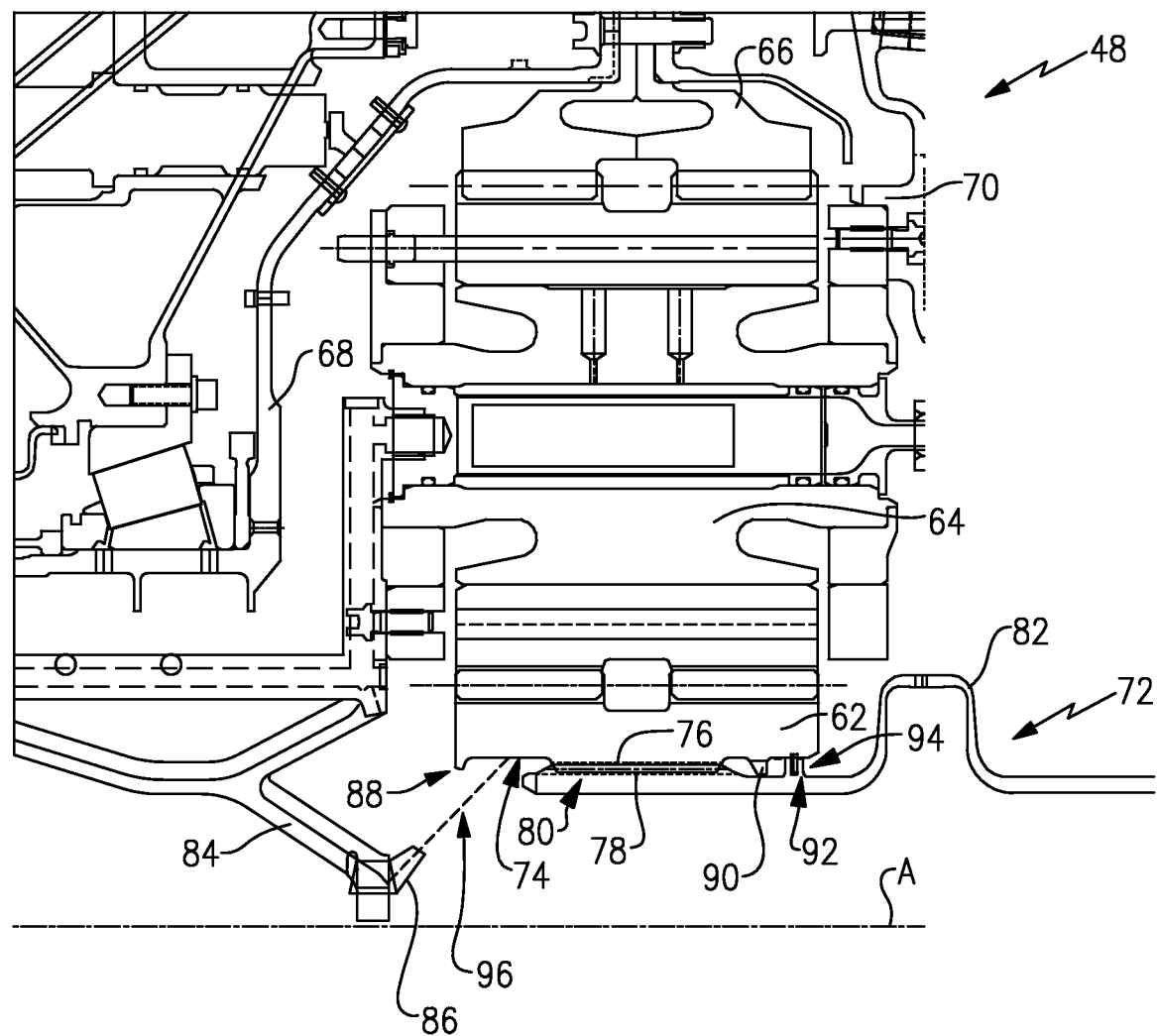
FIG. 2 is a cross-section view of a portion of a fan drive gearbox.
Figure 3:
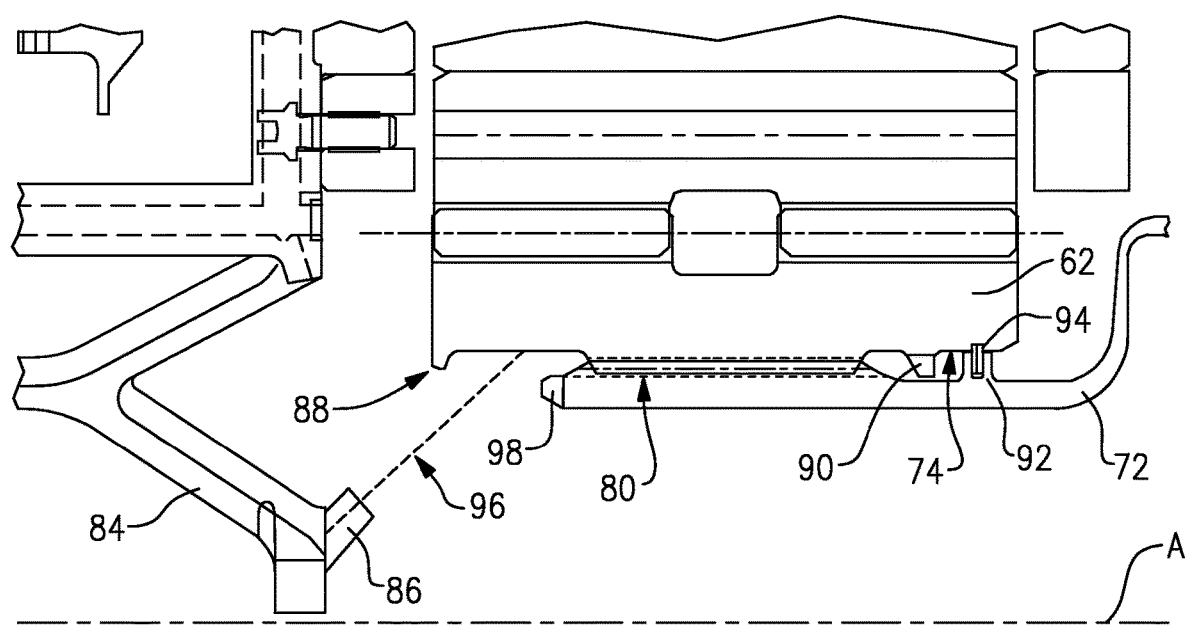
FIG. 3 is an enlarged view of a portion of the example drive gearbox.

Referring to FIGS. 2 and 3, the example fan drive gearbox 48 includes a sun gear 62 that is driven by an input coupling 72. The sun gear 62 in turn drives an intermediate gear 64 that is disposed within a ring gear 66. The intermediate gears 64 are fixed and supported within a carrier 70. The sun gear 62 is driven by input coupling 72 and rotates the intermediate gears 64 that in turn rotates the ring gear 66. The ring gear 66 is attached to a fan shaft 68 to drive the fan section 22.

The input coupling 72 is driven by the low shaft 40 and engages an inner surface of the sun gear 62 at a splined interface 80. The splined interface 80 includes a sun gear section 76 and an input coupling section 78. The splined interface 80 comprises a plurality of inter-fitting longitudinally extending grooves and valleys that inter-fit to transmit torque produced in the turbine section through the low shaft 40 and to the sun gear 62. The input coupling 72 includes a U-shaped portion 82 that accommodates misalignment. Moreover, the splined interface 80 along with the U-shaped portion 82 accommodates some relative axial movement between the sun gear 62 and the input coupling 72.

The splined interface 80 is lubricated by directing a lubricant flow indicated at 96 from a lubricant nozzle 86 supported on a support 84. The support 84 provides for a mounting of the lubricant nozzle 86 such that it can direct lubricant 96 into the interface 80.

A lubricant pool is created and generated, forward and aft of the splined interface 80 by the lubricant flow 96. The example input coupling 72 includes a retaining ring 94 that is mounted within an annular channel 92. The retaining ring 94 extends from the annular channel 92 into sealing interface contact with the inner surface 74 of the sun gear 62. Lubricant that is injected into the splined interface 80 flows through the splined interface 80 and is maintained forward of the retaining ring 94. The retaining ring 94 therefore provides an aft lubricant dam that maintains a lubricant pool within the splined interface 80.

The sun gear 62 also includes a forward tab 88 that aids in maintaining lubricant and directing that lubricant into the interface 80. A tip 98 of the input coupling 72 includes a slight upturn to maintain lubricant within the interface 80 during operation.

The sun gear 62 includes an aft tab 90. The aft tab 90 extends inwardly from the inner surface of the sun gear 62 such that it does not come into contact with the input coupling 72. The aft tab 90 also provides a stop function to limit an axial distance that the input coupling 72 can be inserted into the sun gear 62.

The inner diameter of the sun gear 62 is sized to reduce stresses generated by the transmission of torque from the input coupling 72. The inner surface 74 of the sun gear 64 may also be coated with an anti-wear coating along the inner surface 74 that is in contact with the retaining ring 94 to reduce wear and extend seal life.

Accordingly, the example input coupling 72 includes features that maintain a lubricant pool within the splined interface connection 80 and also that aids in assembly by maintaining the retaining ring 94 within a desired sealing location within the sun gear 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system comprising:
a gear rotatable about an axis, the gear including an inner spline and an aft tab that is spaced apart and aft of the inner spline; and
an input coupling including an outer spline engaged to the inner spline of the gear, the input coupling including an aft oil dam aft of an interface between the outer spline and the inner spline and radially between the input coupling and an inner surface of the gear, wherein the interface between the outer spline and the inner spline is open at a forward end for receiving lubricant and the aft oil dam comprises an annular channel that receives a retaining ring, the retaining ring in sealing interface contact with the gear to maintain lubricant within the interface forward of the aft oil dam and the aft tab is forward of the aft oil dam and extends inward from the gear such that the aft tab does not contact the input coupling.

2. The fan drive gear system as recited in claim 1, wherein the gear includes a forward tab extending radially inward from the inner surface of the gear forward of the inner spline.

3. The fan drive gear system as recited in claim 1, wherein the gear comprises a sun gear.

4. The fan drive gear system as recited in claim 1, wherein the input coupling includes at least one U-shaped portion for accommodating relative movement and misalignment with the gear.

5. A geared turbofan engine comprising:
a fan rotatable about an engine axis;
a core engine including a turbine section driving a turbine shaft;
a gearbox including a sun gear driven by the turbine shaft, the sun gear including an aft tab; and
an input coupling transferring power between the turbine shaft and the sun gear, an interface between the input coupling and the sun gear open at a forward end for receiving lubricant therebetween, wherein a retaining ring is mounted on the input coupling within an annular space between the input coupling and the sun gear, the retaining ring is in sealing interface contact with an inner surface of the sun gear aft of the interface to maintain lubricant within the interface between the sun gear and the input coupling and the aft tab extends inwardly toward the input coupling, forward of the retaining ring and is spaced apart aft of the interface of the sun gear.

6. The geared turbofan engine as recited in claim 5, wherein the sun gear includes a forward tab disposed forward of the interface and aft tab disposed aft of the interface.

7. The geared turbofan engine as recited in claim 5, wherein the interface comprises first splines on an inner surface of the sun gear and second splines on an outer surface of the coupling shaft.

8. The geared turbofan engine as recited in claim 5, including lubricant feeding nozzle directing lubricant within the interface.

9. The geared turbofan engine as recited in claim 5, wherein the retaining ring is supported within an annular channel defined on the input coupling aft of the interface.

10. The geared turbofan engine as recited in claim 5, wherein the input coupling includes at least one flexible portion for accommodating relative movement between the gearbox and the turbine shaft.

11. A method of assembling a geared turbofan engine comprising:
supporting a gearbox about an engine axis;
mounting a retaining ring onto a forward end of an input coupling aft of outer splines; and
inserting the input coupling into a sun gear of the gearbox such that the outer splines of the input coupling engage inner splines of the sun gear at an axial location limited by an aft tab spaced apart from the inner splines and extending inward from the sun gear with the retaining ring in sealing interface contact with an inner surface of the sun gear aft of the aft tab.

12. The method as recited in claim 11, including forming an annular channel on the input coupling for holding the retaining ring on the input coupling.

13. The method as recited in claim 11, including mounting an oil jet proximate the inner surface of the sun gear for directing oil into an interface between the input coupling and the sun gear.

\* \* \* \* \*